(12) United States Patent
Hong

(10) Patent No.: US 11,974,137 B2
(45) Date of Patent: Apr. 30, 2024

(54) METHOD FOR OCCUPYING RESOURCES IN UNLICENSED FREQUENCY BAND, TERMINAL AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 361 days.

(21) Appl. No.: 17/417,286

(22) PCT Filed: Dec. 27, 2018

(86) PCT No.: PCT/CN2018/124322
§ 371 (c)(1),
(2) Date: Jun. 22, 2021

(87) PCT Pub. No.: WO2020/133055
PCT Pub. Date: Jul. 2, 2020

(65) Prior Publication Data
US 2022/0078624 A1 Mar. 10, 2022

(51) Int. Cl.
*H04W 16/14* (2009.01)
*H04W 72/04* (2023.01)
*H04W 74/0808* (2024.01)
*H04W 84/12* (2009.01)

(52) U.S. Cl.
CPC .......... *H04W 16/14* (2013.01); *H04W 72/04* (2013.01); *H04W 74/0808* (2013.01); *H04W 84/12* (2013.01)

(58) Field of Classification Search
CPC .. H04W 16/14; H04W 72/04; H04W 74/0808
See application file for complete search history.

(56) References Cited

U.S. PATENT DOCUMENTS

| 2016/0119846 | A1* | 4/2016 | Chou ................. H04W 72/541 370/331 |
| 2016/0173361 | A1* | 6/2016 | Somasundaram ... H04B 17/318 370/328 |
| 2017/0013469 | A1 | 1/2017 | Larsson et al. |

FOREIGN PATENT DOCUMENTS

CN  108605368 A  7/2018

OTHER PUBLICATIONS

PCT/CN2018/124322 English translation fo the International Search Report dated May 29, 2019, 2 pages.

* cited by examiner

*Primary Examiner* — Won Tae C Kim
(74) *Attorney, Agent, or Firm* — COZEN O'CONNOR

(57) ABSTRACT

A method for occupying resources in an unlicensed frequency band includes: when a cellular component of a terminal executes a first LBT process on a first frequency domain resource included in an unlicensed frequency band, a WiFi component of the terminal executes a second LBT process on a second frequency domain resource included in the unlicensed frequency band, wherein the first frequency domain resource and the second frequency domain resource are the same or different.

12 Claims, 3 Drawing Sheets executing by a WiFi component of a terminal, a second listen LBT process on second frequency domain resources included in the unlicensed frequency band when a first LBT process on first frequency domain resources included in the unlicensed frequency band is executed by a cellular component of the terminal ~201

METHOD FOR OCCUPYING RESOURCES IN UNLICENSED FREQUENCY BAND, TERMINAL AND STORAGE MEDIUM

CROSS-REFERENCE TO RELATED APPLICATION

This application is the U.S. national phase application of International Application No. PCT/CN2018/124322, filed on Dec. 27, 2018, the entire contents of which are incorporated herein by reference for all purposes.

TECHNICAL FIELD

The disclosure relates to the field of communication technology, and more particularly to a method for occupying resources in an unlicensed frequency band, a terminal and a storage medium.

BACKGROUND

The 5G new radio (NR) system not only occupies the licensed frequency bands for transmission, but also occupies the unlicensed frequency bands for transmission to improve the utilization of spectrum resources.

The unlicensed frequency bands are spectrum resources that may be used directly without the permission of a regulatory authority. The terminal that transmits on the unlicensed frequency bands need to follow a listen before talk (LBT) mechanism. That is, the terminal that transmits on the unlicensed frequency bands need to perform the LBT process before the information transmission to detect whether the unlicensed frequency bands are occupied. If the unlicensed frequency bands are not occupied, that is, they are in an idle state, the terminal can occupy the unlicensed frequency bands for the information transmission.

In the above related art, the terminal obtains the physical resources in the unlicensed frequency bands for the information transmission through a contention, which will cause the terminal to have a low probability of obtaining a transmission opportunity in the unlicensed frequency bands.

SUMMARY

According to a first aspect of the disclosure, a method for occupying resources in an unlicensed frequency band includes: executing by a wireless fidelity (WiFi) component of a terminal, a second listen before talk (LBT) process on second frequency domain resources included in the unlicensed frequency band when a first LBT process on first frequency domain resources included in the unlicensed frequency band is executed by a cellular component of the terminal. The first frequency domain resources and the second frequency domain resources are the same or different.

According to a second aspect of the disclosure, a terminal includes a wireless fidelity (WiFi) component, a cellular component, a processor and a memory for storing instructions executable by the processor. The processor is configured to: control the WiFi component to execute a second listen before talk (LBT) process on second frequency domain resources included in the unlicensed frequency band when a first LBT process on first frequency domain resources included in the unlicensed frequency band is executed by the cellular component. The first frequency domain resources and the second frequency domain resources are the same or different.

According to a third aspect of the disclosure, a non-transitory computer-readable storage medium has a computer program stored thereon. When the computer program is executed by a processor, a method for occupying resources in an unlicensed frequency band is implemented. The method includes: executing by a wireless fidelity (WiFi) component of a terminal, a second listen before talk (LBT) process on second frequency domain resources included in the unlicensed frequency band when a first LBT process on first frequency domain resources included in the unlicensed frequency band is executed by a cellular component of the terminal. The first frequency domain resources and the second frequency domain resources are the same or different.

It should be understood that the above general description and the following detailed description are only exemplary and explanatory, which cannot limit the present disclosure.

BRIEF DESCRIPTION OF THE DRAWINGS

The drawings herein are incorporated into the specification and constitute a part of the specification, show embodiments in accordance with the disclosure and are used to explain the principle of the disclosure together with the specification.

DETAILED DESCRIPTION

The exemplary embodiments will be described in detail here, and examples thereof are illustrated in the accompanying drawings. When the following description refers to the drawings, unless otherwise indicated, the same numbers in different drawings indicate the same or similar elements. The implementations described in the following exemplary embodiments do not represent all implementations consistent with the disclosure. Rather, they are merely examples of apparatuses and methods consistent with some aspects of the disclosure.

The network architecture and service scenarios described in the embodiments of the disclosure are intended to more clearly illustrate the technical solutions of the embodiments of the disclosure, and do not constitute a limitation on the technical solutions according to the embodiments of the disclosure. Those skilled in the art would know that the technical solutions according to the embodiments of the disclosure are also applicable to similar technical problems with the evolution of the network architecture and the emergence of new service scenarios.

Figures 1, 2:
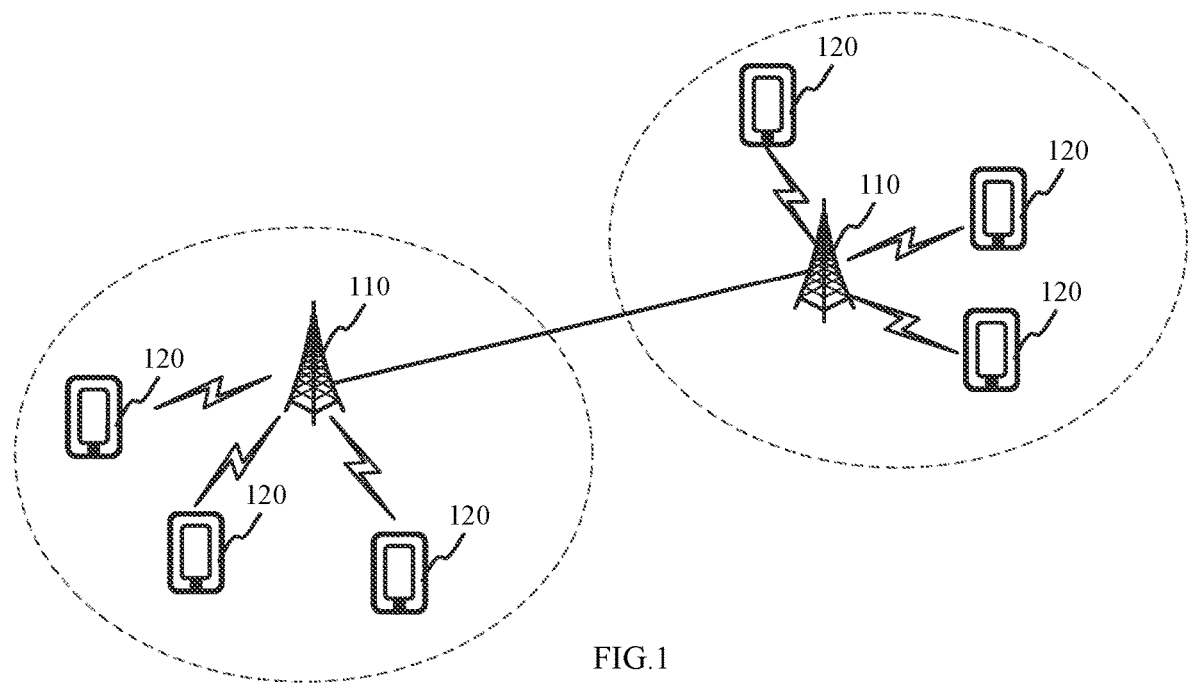
FIG. 1 is a schematic diagram illustrating a network architecture according to an exemplary embodiment.
FIG. 2 is a flowchart illustrating a method for occupying resources in an unlicensed frequency band according to an exemplary embodiment.

FIG. 1 is a schematic diagram illustrating a network architecture according to an exemplary embodiment. The network architecture may include: a base station 110 and a terminal 120.

The base station 110 is deployed in the access network. The access network in the 5G NR system may be called a new generation-radio access network (NG-RAN). The base station 110 and the terminal 120 communicate with each other through a certain air interface technology, for example they may communicate with each other through the cellular technology.

The base station 110 is an apparatus deployed in an access network to provide the terminal 120 with a wireless communication function. The base station 110 may include various forms of macro base stations, micro base stations, relay stations, access points, and so on. In the systems using different wireless access technologies, the name of the apparatus with a base station function may be different. For example, in the 5G NR systems, it is called a gNodeB or a gNB. As the communication technology evolves, the name "base station" may change. For ease of description, in the embodiments of the disclosure, the above-mentioned apparatus that provides the terminal 120 with the wireless communication function is collectively referred to as a base station.

There are usually multiple terminals 120, and one or more terminals 120 may be distributed in a cell managed by each base station 110. The terminal 120 may include various handheld devices with wireless communication functions, vehicle-mounted devices, wearable devices, computing devices or other processing devices connected to a wireless modem, as well as a user equipment (UE), a mobile station (MS), a terminal device, etc. in various forms. For ease of description, the above-mentioned devices are collectively referred to as terminals in the embodiments of the disclosure.

The "5G NR system" in the embodiments of the disclosure may also be referred to as a 5G system or an NR system, but those skilled in the art can understand its meaning. The technical solutions described in the embodiments of the disclosure may be applicable to the 5G NR system, and may also be applicable to the subsequent evolution system of the 5G NR system.

FIG. 2 is a flowchart illustrating a method for occupying resources in an unlicensed frequency band according to an exemplary embodiment. This method may be applied to the terminal 120 shown in FIG. 1. The method may include block 201.

In block 201, a WiFi component of a terminal executes a second LBT process on second frequency domain resources included in the unlicensed frequency band when a cellular component of the terminal executes a first LBT process on first frequency domain resources included in the unlicensed frequency band.

When the cellular component of the terminal executes the first LBT process on the unlicensed frequency band, the WiFi component of the terminal can execute the second LBT process on the unlicensed frequency band. That is, the cellular component and the WiFi component jointly execute the LBT process on the unlicensed frequency band, thereby increasing the probability that the terminal competes for physical resources on the unlicensed frequency band, and improving the probability that the terminal obtains transmission opportunities on the unlicensed frequency band.

In the embodiment of the disclosure, the terminal includes a cellular component and a WiFi component.

The cellular component is a communication component for accessing the cellular network provided by the operator. A cellular network is also called a mobile network which may include a core network and an access network. Several core network devices are deployed in the core network. The functions of the core network devices are mainly to provide the users with connections, manage the users, and carry out the services carrying (serving as a bear-network to provide an interface to the external network). In the 5G NR system, the core network may include devices such as access and mobility management function (AMF) entities, user plane function (UPF) entities, and session management function (SMF) entities. Several access network devices such as base stations are deployed in the access network. The access network device is used to provide the wireless communication function for the terminal. The cellular network may be a 2G network, a 3G network, a 4G network, a 5G network, or a cellular network subsequently evolved, or a combination thereof.

The WiFi component (also known as a serial port Wi-Fi module) is a communication component for accessing a wireless local area network (WLAN), belonging to the transmission layer of the Internet of Things. In an embodiment, the WiFi component may be an embedded component for converting the serial port or Transistor-Transistor Logic (TTL) level to be consistent with the Wi-Fi wireless network communication standard, and may have a built-in wireless network protocol IEEE802.11b.g.n Protocol stack and TCP/IP protocol stack. The WLAN network may also be referred to as a WiFi network. The WLAN network may include several access points (APs), which are also called wireless access points or hotspots for terminals to access the WLAN network.

Since the terminal needs to follow the LBT mechanism in transmitting information on the unlicensed frequency band, it is necessary to first perform the LBT process on the unlicensed frequency band when the cellular component of the terminal needs to occupy the unlicensed frequency band for information transmission, so as to detect whether the unlicensed frequency band is occupied. If the unlicensed frequency band is not occupied (i.e., it is in an idle state), the terminal may occupy the unlicensed frequency band and start the information transmission in the unlicensed frequency band. The above information may be service data or control signaling, which is not limited in the embodiments of the disclosure.

The above first LBT process refers to a LBT process executed by the cellular component, and the second LBT process refers to a LBT process executed by the WiFi component. The steps included in the first LBT process and the second LBT process may be the same or different, which is not limited in the embodiments of the disclosure. In addition, the first LBT process and the second LBT process may be executed at the same time or sequentially, which is not limited in the embodiments of the disclosure.

Alternatively, the cellular component executes the first LBT process on the first frequency domain resources included in the unlicensed frequency band, and the WiFi component executes the second LBT process on the second frequency domain resources included in the unlicensed frequency band. The first frequency domain resources and the second frequency domain resources may be the same. For example, the cellular component and the WiFi component perform the LBT process on the same subcarrier. Or the first frequency domain resources and the second frequency domain resources may also be different. For example, the cellular component and the WiFi component perform the LBT process on two different subcarriers.

In summary, in the technical solution according to the embodiments of the disclosure, when the cellular component of the terminal needs to occupy the unlicensed frequency band for information transmission, the cellular component and the WiFi component jointly execute the LBT process on the unlicensed frequency band. Compared with the original solution that the LBT process is executed only by the cellular component to obtain physical resources, the solution in the embodiments of the disclosure that the cellular component and the WiFi component jointly execute the LBT process to obtain physical resources may improve the probability of obtaining the physical resources in the unlicensed frequency band through contention, thereby increasing the probability that the terminal obtains a transmission opportunity on the unlicensed frequency band.

Figure 3:
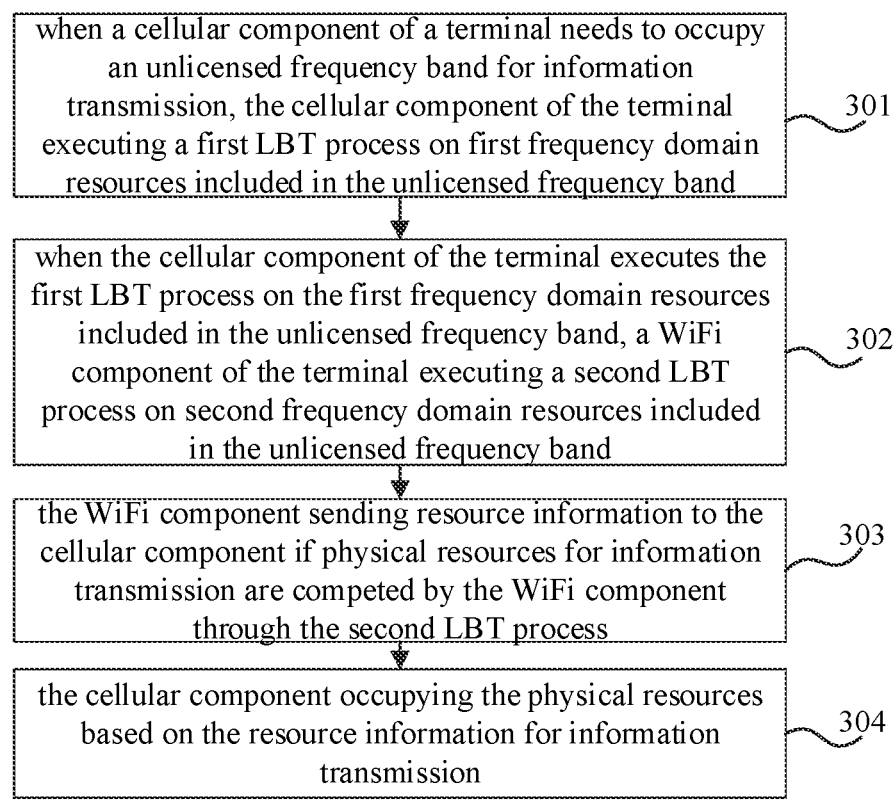
FIG. 3 is a flowchart illustrating a method for occupying resources in an unlicensed frequency band according to another exemplary embodiment.

FIG. 3 is a flowchart illustrating a method for occupying resources in an unlicensed frequency band according to another exemplary embodiment. This method may be applied to the terminal 120 shown in FIG. 1. The method may include the following blocks 301-304.

In block 301, when a cellular component of a terminal needs to occupy an unlicensed frequency band for information transmission, the cellular component of the terminal executes a first LBT process on first frequency domain resources included in the unlicensed frequency band.

In block 302, when the cellular component executes the first LBT process on the first frequency domain resources included in the unlicensed frequency band, a WiFi component of the terminal executes a second LBT process on second frequency domain resources included in the unlicensed frequency band if the WiFi component is in an idle state.

The idle state of the WiFi component indicates a state in which the WiFi component is not used, that is, a state in which the WiFi component has not established a connection with the AP.

Alternatively, the terminal further includes a processing component through which the terminal detects whether the WiFi component is in the idle state. The above processing component is a component for controlling various operations (such as detecting, sending, and receiving) of the terminal. For example, the processing component may be a processor or a controller of the terminal.

When the processing component of the terminal detects that the WiFi component is in the idle state, the processing component calls the WiFi component to make it jointly execute the LBT process on the unlicensed frequency band. In addition, if the WiFi component is in a non-idle state, the WiFi component does not execute the second LBT process to avoid affecting normal operation of the WiFi component and avoiding interference to the transmission task of the WiFi component.

Of course, in some other possible embodiments, the processing component may also call the WiFi component directly to execute the second LBT process on the unlicensed frequency band without detecting whether the WiFi component is in the idle state.

In block 303, the WiFi component sends resource information to the cellular component if physical resources for information transmission are competed by the WiFi component through the second LBT process.

The resource information is configured to indicate time-frequency positions of the physical resources competed by the WiFi component. The above physical resources include time domain resources and frequency domain resources. The time-frequency positions of the physical resources refer to positions of the time domain resources and positions of the frequency domain resources. The time domain resources are time resources represented by frames, subframes, time slots, and symbols. The frequency domain resources are frequency resources represented by subcarriers.

Alternatively, the physical resources also include code domain resources and/or space domain resources. The code domain resources refer to code channel resources represented by scrambling codes. The space domain resources are spatial resources represented by parallel sub-channels that are approximately realized through beamforming processing. The space domain resources may refer to beam directions. Correspondingly, the resource information is also configured to indicate location information of the code domain resources and/or the space domain resources competed by the WiFi component.

Alternatively, the WiFi component sends the resource information directly to the cellular component; and/or the WiFi component sends the resource information to a processing component of the terminal. The processing component is configured to forward the resource information to the cellular component. If a direct communication link is established between the WiFi component and the cellular component, the WiFi component may send the resource information directly to the cellular component through the communication link. If there is no direct communication link established between the WiFi component and the cellular component, the resource information may be forwarded by the processing component to the cellular component from the WiFi component.

In block 304, the cellular component occupies the physical resources based on the resource information for information transmission.

After obtaining the resource information, the cellular component occupies the physical resources for information transmission based on the time-frequency positions of the physical resources indicated by the resource information. Alternatively, the information includes service data and/or control signaling.

Alternatively, when the physical resources for information transmission are competed by the cellular component through the first LBT process, the physical resources are directly occupied by the cellular component to transmit the information.

Alternatively, when the physical resources for information transmission are competed by the cellular component, the cellular component may also send a stop notification to the WiFi component if the WiFi component has been called to execute the second LBT process, thereby saving processing overhead. The stop notification is configured to instruct the WiFi component to stop executing the second LBT process. After receiving the stop notification, the WiFi component stops executing the second LBT process.

Alternatively, the cellular component sends the stop notification directly to the WiFi component, and/or the cellular component sends the stop notification to the processing component, then the processing component forwards the stop notification to the WiFi component.

In summary, in the technical solution according to the embodiments of the disclosure, when the cellular component of the terminal needs to occupy the unlicensed frequency band for information transmission, the cellular component and the WiFi component jointly execute the LBT process on the unlicensed frequency band. Compared with the original solution that the LBT process is executed only by the cellular component to obtain physical resources, the solution in the embodiments of the disclosure that the cellular component and the WiFi component jointly execute the LBT process to obtain physical resources may improve the probability of obtaining the physical resources in the unlicensed frequency band through contention, thereby increasing the probability that the terminal obtains a transmission opportunity on the unlicensed frequency band.

In addition, the terminal calls the WiFi component to execute the LBT process on the unlicensed frequency band only when the WiFi component is in the idle state, so as to avoid affecting normal operation of the WiFi component and avoiding interference to the transmission task of the WiFi component.

The apparatus embodiments of the disclosure are described as below, which may be used to implement the method embodiments of the disclosure. For details that are not disclosed in the apparatus embodiments of the disclosure, please refer to the method embodiments of the disclosure.

Figure 4:
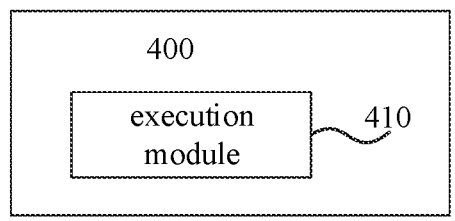
FIG. 4 is a block diagram illustrating an apparatus for occupying resources in an unlicensed frequency band according to an exemplary embodiment.

FIG. 4 is a block diagram illustrating an apparatus for occupying resources in an unlicensed frequency band according to an exemplary embodiment. The apparatus has the function of executing the above method examples, which may be implemented in hardware, or implemented by causing the hardware to execute respective software. The apparatus is applied to a WiFi component of a terminal. The apparatus 400 may include an execution module 410.

The execution module 410 is configured to execute a second listen before talk (LBT) process on second frequency domain resources included in the unlicensed frequency band when a first LBT process on first frequency domain resources included in the unlicensed frequency band is executed by a cellular component of the terminal. The first frequency domain resources and the second frequency domain resources are the same or different.

In summary, in the technical solution according to the embodiments of the disclosure, when the cellular component of the terminal needs to occupy the unlicensed frequency band for information transmission, the cellular component and the WiFi component jointly execute the LBT process on the unlicensed frequency band. Compared with the original solution that the LBT process is executed only by the cellular component to obtain physical resources, the solution in the embodiments of the disclosure that the cellular component and the WiFi component jointly execute the LBT process to obtain physical resources may improve the probability of obtaining the physical resources in the unlicensed frequency band through contention, thereby increasing the probability that the terminal obtains a transmission opportunity on the unlicensed frequency band.

Alternatively, the execution module 410 is configured to perform the step of executing the second LBT process on the second frequency domain resources included in the unlicensed frequency band when the WiFi component is in an idle state.

Figure 5:
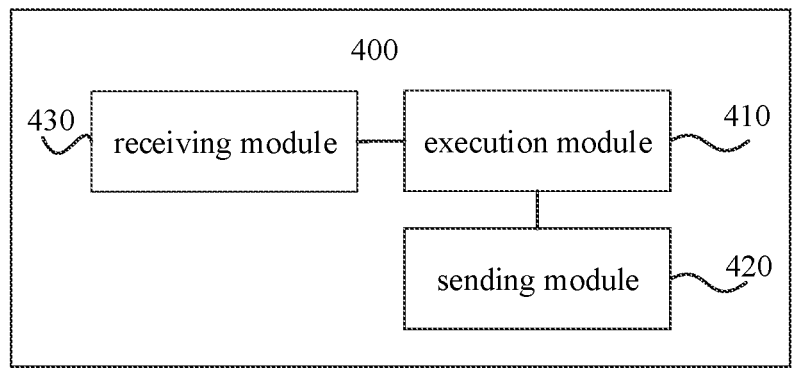
FIG. 5 is a block diagram illustrating an apparatus for occupying resources in an unlicensed frequency band according to another exemplary embodiment.

Alternatively, as illustrated in FIG. 5, the apparatus 400 further includes: a sending module 420.

The sending module 420 is configured to send resource information to the cellular component when physical resources are competed through the second LBT process. The resource information is configured to indicate time-frequency positions of the physical resources competed by the WiFi component. The cellular component is configured to occupy the physical resources based on the resource information for information transmission.

Alternatively, the sending module 420 is configured to: send the resource information directly to the cellular component; and/or send the resource information to a processing component of the terminal. The processing component is configured to forward the resource information to the cellular component.

Alternatively, as illustrated in FIG. 5, the apparatus 400 further includes: a receiving module 430.

The receiving module 430 is configured to receive a stop notification sent by the cellular component. The stop notification is sent after physical resources are competed by the cellular component through the first LBT process.

The execution module 410 is further configured to stop executing the second LBT process based on the stop notification.

An exemplary embodiment of the disclosure also provides a terminal, which can implement a method for occupying resources in an unlicensed frequency band according to the disclosure. The device includes: a processor; and a memory for storing instructions executable by the processor. The processor is configured to control a WiFi component to execute a second LBT process on second frequency domain resources included in the unlicensed frequency band when a first LBT process on first frequency domain resources included in the unlicensed frequency band is executed by a cellular component of the terminal The first frequency domain resources and the second frequency domain resources are the same or different.

Alternatively, the processor is further configured to: when the WiFi component is in an idle state, control the WiFi component to perform the step of executing the second LBT process on the second frequency domain resources included in the unlicensed frequency band.

Alternatively, the processor is further configured to: control the WiFi component to send resource information to the cellular component when physical resources are competed by the WiFi component through the second LBT process. The resource information is configured to indicate time-frequency positions of the physical resources competed by the WiFi component. The cellular component is configured to occupy the physical resources based on the resource information for information transmission.

Alternatively, the WiFi component sends the resource information directly to the cellular component; and/or the WiFi component sends the resource information to a processing component of the terminal. The processing component is configured to forward the resource information to the cellular component.

Alternatively, the processor is further configured to: control the cellular component to send a stop notification to the WiFi component after the physical resources are competed by the cellular component through the first LBT process; and control the WiFi component to stop executing the second LBT process based on the stop notification.

Figure 6:
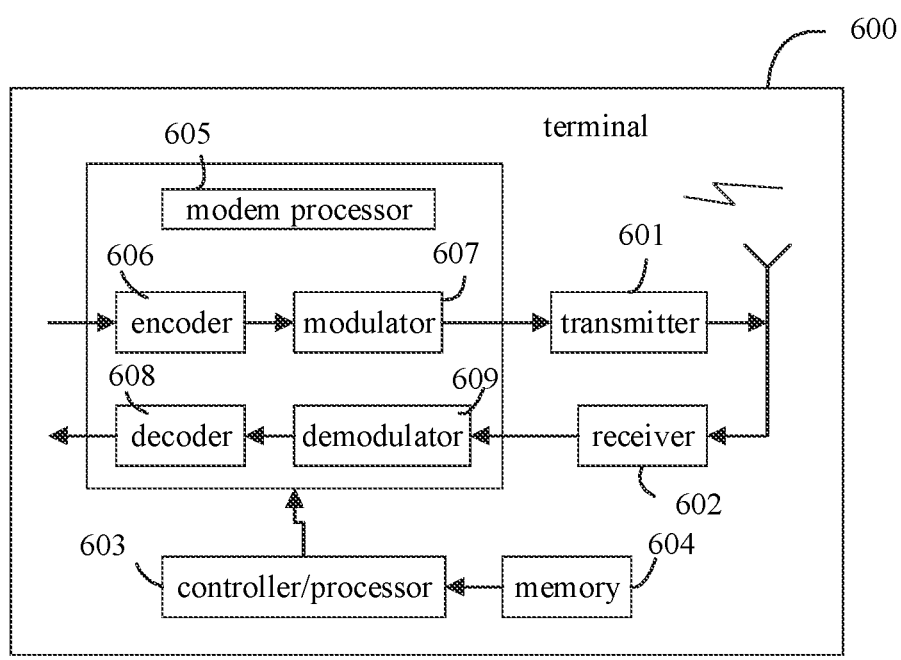
FIG. 6 is a structural block diagram illustrating a terminal according to an exemplary embodiment.

FIG. 6 is a structural schematic diagram of a terminal 600 according to an exemplary embodiment. The terminal also includes a cellular component and a WiFi component.

The terminal 600 includes a transmitter 601, a receiver 602, and a processor 603. The processor 603 may also be a controller, which is represented as "controller/processor 603" in FIG. 6, i.e., the processing component described above. Alternatively, the terminal 600 may further include a modem processor 605, wherein the modem processor 605 may include an encoder 606, a modulator 607, a decoder 608, and a demodulator 609.

In an example, the transmitter 601 adjusts (e.g., analog-converts, filters, amplifies, and up-converts, etc.) output samples and generates an uplink signal, which is transmitted via an antenna to a base station. On a downlink, the antenna receives a downlink signal transmitted by the base station. The receiver 602 adjusts (e.g., filters, amplifies, down-converts, digitizes, etc.) a signal received from the antenna and provides input samples. In the modem processor 605, the encoder 606 receives service data and signaling messages to be transmitted on the uplink, and processes (for example, formats, encodes, and interleaves) the service data and signaling messages. The modulator 607 further processes (for example, symbol maps and modulates) the encoded service data and signaling messages and provides output samples. The demodulator 609 processes (e.g., demodulates) the input samples and provides symbol estimates. The decoder 608 processes (e.g., de-interleaves and decodes) the symbol estimates and provides the decoded data and signaling messages sent to the terminal 600. The encoder 606, the modulator 607, the demodulator 609, and the decoder 608 may be implemented by a synthesized modem processor 605. These units are processed according to the radio access technology (for example, the 5G NR and access technologies of other evolved systems) adopted by the radio access network. It should be noted that when the terminal 600 does not include the modem processor 605, the above functions of the modem processor 605 may also be performed by the processor 603.

The processor 603 controls and manages the actions of the terminal 600, and is used to execute the processing procedures performed by the terminal 600 in the above embodiments of the disclosure. For example, the processor 603 is further configured to execute each step in the above method embodiments and/or other steps of the technical solution described in the embodiments of the disclosure.

Further, the terminal 600 may further include a memory 604 configured to store program codes and data for the terminal 600.

It may be understood that, FIG. 6 only illustrates a simplified design of the terminal 600. In practical applications, the terminal 600 may include any number of transmitters, receivers, processors, modem processors, memories, etc., and all terminals that may implement the embodiments of the disclosure are within the protection scope of the embodiments of the disclosure.

The embodiment of the disclosure also provides a non-transitory computer-readable storage medium having a computer program stored thereon. When the computer program is executed by a processor of the terminal, the steps of the method for occupying resources in an unlicensed frequency band are implemented.

It should be understood that, the term "plurality" mentioned herein refers to two or more. The term "and/or" describes an association relationship between the associated objects, indicating that there may be three types of relationships. For example, A and/or B may indicate that: A alone exists, A and B exist at the same time, and B exists alone. The character "/" generally indicates that the associated objects before and after are in an "or" relationship.

Other embodiments of the disclosure will be easily envisaged for those skilled in the art after consideration of the specification and practicing the invention disclosed herein. The disclosure is intended to cover any variations, uses, or adaptive changes of the disclosure that follow the general principles of the disclosure and include common knowledge or conventional technical means in the technical field that are not disclosed in the disclosure. The description and the embodiments are regarded as exemplary only, and the true scope and spirit of the disclosure are pointed out by the appended claims.

It should be understood that, the disclosure is not limited to the precise structure that has been described above and illustrated in the drawings, and various modifications and changes may be made without departing from its scope. The scope of the disclosure is only limited by the appended claims.

What is claimed is:

1. A method for occupying resources in an unlicensed frequency band, comprising:
    executing by a wireless fidelity (WiFi) component of a terminal, a second listen before talk (LBT) process on second frequency domain resources included in the unlicensed frequency band when a first LBT process on first frequency domain resources included in the unlicensed frequency band is jointly executed by a cellular component of the terminal;
    wherein the first frequency domain resources and the second frequency domain resources are the same or different;
    wherein the method further comprises: sending by the WiFi component, resource information to the cellular component when physical resources are competed by the WiFi component through the second LBT process, wherein the resource information is configured to indicate time-frequency positions of the physical resources competed by the WiFi component, and the cellular component is configured to occupy the physical resources based on the resource information for information transmission.

2. The method of claim 1, further comprising:
    when the WiFi component is in an idle state, executing by the WiFi component the second LBT process on the second frequency domain resources included in the unlicensed frequency band.

3. The method of claim 1, further comprising:
    receiving by the WiFi component, a stop notification sent by the cellular component, wherein the stop notification is sent after physical resources are competed by the cellular component through the first LBT process; and
    stopping by the WiFi component, executing the second LBT process based on the stop notification.

4. The method of claim 1, wherein sending by the WiFi component, the resource information to the cellular component comprises:
    sending by the WiFi component, the resource information directly to the cellular component; and/or
    sending by the WiFi component, the resource information to a processing component of the terminal, wherein the processing component is configured to forward the resource information to the cellular component.

5. A terminal, comprising:
    a wireless fidelity (WiFi) component;
    a cellular component;
    a processor; and
    a memory for storing instructions executable by the processor;
    wherein the processor is configured to:
    control the WiFi component to execute a second listen before talk (LBT) process on second frequency domain resources included in the unlicensed frequency band when a first LBT process on first frequency domain resources included in the unlicensed frequency band is jointly executed by the cellular component;
    wherein the first frequency domain resources and the second frequency domain resources are the same or different;
    wherein the processor is further configured to control the WiFi component to send resource information to the cellular component when physical resources are competed by the WiFi component through the second LBT process, wherein the resource information is configured to indicate time-frequency positions of the physical resources competed by the WiFi component, and the cellular component is configured to occupy the physical resources based on the resource information for information transmission.

6. The terminal of claim 5, wherein the processor is configured to control the WiFi component to execute the second LBT process on the second frequency domain resources included in the unlicensed frequency band when the WiFi component is in an idle state.

7. The terminal of claim 5, wherein the WiFi component is configured to:
   send the resource information directly to the cellular component; and/or
   send the resource information to a processing component of the terminal, wherein the processing component is configured to forward the resource information to the cellular component.

8. The terminal of claim 5, wherein the processor is further configured to:
   control the cellular component to send a stop notification to the WiFi component after physical resources are competed by the cellular component through the first LBT process; and
   control the WiFi component to stop executing the second LBT process based on the stop notification.

9. A non-transitory computer-readable storage medium having a computer program stored thereon, wherein when executed by a processor, the computer program is configured to implement a method for occupying resources in an unlicensed frequency band, the method comprising:
   executing by a wireless fidelity (WiFi) component of a terminal, a second listen before talk (LBT) process on second frequency domain resources included in the unlicensed frequency band when a first LBT process on first frequency domain resources included in the unlicensed frequency band is jointly executed by a cellular component of the terminal;
   wherein the first frequency domain resources and the second frequency domain resources are the same or different;
   wherein the method further comprises: sending by the WiFi component, resource information to the cellular component when physical resources are competed by the WiFi component through the second LBT process, wherein the resource information is configured to indicate time-frequency positions of the physical resources competed by the WiFi component, and the cellular component is configured to occupy the physical resources based on the resource information for information transmission.

10. The storage medium of claim 9, wherein the method further comprises:
    when the WiFi component is in an idle state, executing by the WiFi component the second LBT process on the second frequency domain resources included in the unlicensed frequency band.

11. The storage medium of claim 9, wherein sending by the WiFi component, the resource information to the cellular component comprises:
    sending by the WiFi component, the resource information directly to the cellular component; and/or
    sending by the WiFi component, the resource information to a processing component of the terminal, wherein the processing component is configured to forward the resource information to the cellular component.

12. The storage medium of claim 9, further comprising:
    receiving by the WiFi component, a stop notification sent by the cellular component, wherein the stop notification is sent after physical resources are competed by the cellular component through the first LBT process; and
    stopping by the WiFi component, executing the second LBT process based on the stop notification.

* * * * *